US005872413A

United States Patent [19]

Magliari

[11] Patent Number: 5,872,413

[45] Date of Patent: Feb. 16, 1999

[54] PEDAL ACTIVATED MOTOR ATTACHMENT FOR A HAND OPERATED FOOD GRINDER

[76] Inventor: Salvatore Magliari, 40 Apache Dr., Westerly, R.I. 02891

[21] Appl. No.: 839,963

[22] Filed: Apr. 24, 1997

[51] Int. Cl.[6] .............................. B02C 18/36; H02K 5/00

[52] U.S. Cl. ............................ 310/83; 310/89; 310/75 B; 241/82.1; 241/101.2

[58] Field of Search ............................ 310/89, 83, 75 B; 241/82.5, 82.6, 82.1, 101.2

[56] References Cited

U.S. PATENT DOCUMENTS

| | | | |
|---|---|---|---|
| 4,397,427 | 8/1983 | Howard | 241/30 |
| 4,546,575 | 10/1985 | Adams | 51/288 |
| 4,736,896 | 4/1988 | Wagner | 241/82.6 |
| 4,956,589 | 9/1990 | Cherlo | 318/67 |
| 5,350,595 | 9/1994 | Hockenberry et al. | 426/582 |
| 5,486,100 | 1/1996 | Hsu | 425/190 |

*Primary Examiner*—Nestor Ramirez
*Assistant Examiner*—Karl Eizo Tamai

[57] ABSTRACT

A pedal activated motor attachment for a hand operated food grinder for allowing a user to convert a hand operated machine into a pedal driven machine. The inventive device includes a motor positioned within a housing. The motor powers a series of gears including a drive gear having a socket for receiving the grinder shaft of a hand operated food grinder. The housing has an aperture for receiving an attachment key of the hand operated food grinder whereby the grinder shaft is coupled to the drive gear. A foot pedal is electrically connected to the motor such that the motor is actuatable by depression of the foot pedal.

8 Claims, 4 Drawing Sheets

FIG 4
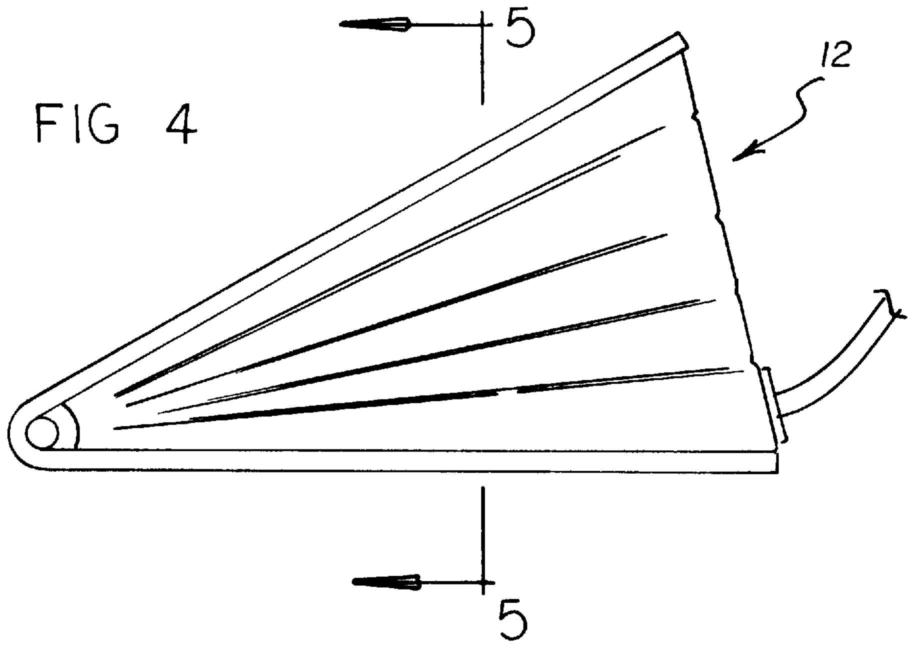
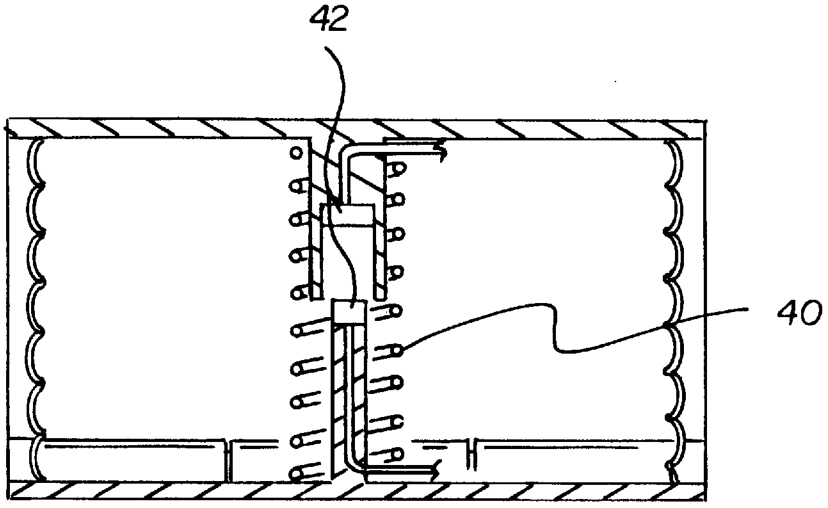
FIG 5

PEDAL ACTIVATED MOTOR ATTACHMENT FOR A HAND OPERATED FOOD GRINDER

BACKGROUND OF THE INVENTION

1. Field of the Invention

The present invention relates to a motor attachment and more particularly pertains to a new pedal activated motor attachment for a hand operated food grinder which allows a user to convert a hand operated machine into a pedal driven machine.

2. Description of the Prior Art

The use of a motor attachment is known in the prior art. More specifically, a motor attachment heretofore devised and utilized are known to consist basically of familiar, expected and obvious structural configurations, notwithstanding the myriad of designs encompassed by the crowded prior art which have been developed for the fulfillment of countless objectives and requirements.

Known prior art motor attachments include U.S. Pat. No. 4,330,697; U.S. Pat. No. 4,736,896; U.S. Pat. No. 292,473; U.S. Pat. No. 4,138,066; U.S. Pat. No. 254,356 and U.S. Pat. No. 5,039,973.

While these devices fulfill their respective, particular objectives and requirements, the aforementioned patents do not disclose a new pedal activator motor attachment for a hand operated food grinder. The inventive device includes a motor, an attaching screw, a male plug, and a foot pedal.

In these respects, the pedal activated motor attachment for a hand operated food grinder according to the present invention substantially departs from the conventional concepts and designs of the prior art, and in so doing provides an apparatus primarily developed for the purpose of allowing a user to convert a hand operated machine into a pedal driven machine.

SUMMARY OF THE INVENTION

In view of the foregoing disadvantages inherent in the known types of a motor attachment now present in the prior art, the present invention provides a new pedal activated motor attachment for a hand operated food grinder construction wherein the same can be utilized for allowing a user to convert a hand operated machine into a pedal driven machine.

The general purpose of the present invention, which will be described subsequently in greater detail, is to provide a new pedal activated motor attachment for a hand operated food grinder apparatus and method which has many of the advantages of the a motor attachment mentioned heretofore and many novel features that result in a new pedal activated motor attachment for a hand operated food grinder which is not anticipated, rendered obvious, suggested, or even implied by any of the prior art a motor attachment, either alone or in any combination thereof.

To attain this, the present invention generally comprises a motor, an attaching screw, a male plug, and a foot pedal.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who arc not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pedal activated motor attachment for a hand operated food grinder apparatus and method which has many of the advantages of the a motor attachment mentioned heretofore and many novel features that result in a new pedal activated motor attachment for a hand operated food grinder which is not anticipated, rendered obvious, suggested, or even implied by any of the prior art a motor attachment, either alone or in any combination thereof.

It is another object of the present invention to provide a new pedal activated motor attachment for a hand operated food grinder which may be easily and efficiently manufactured and marketed.

It is a further object of the present invention to provide a new pedal activated motor attachment for a hand operated food grinder which is of a durable and reliable construction.

An even further object of the present invention is to provide a new pedal activated motor attachment for a hand operated food grinder which is susceptible of a low cost of manufacture with regard to both materials and labor, and which accordingly is then susceptible of low prices of sale to the consuming public, thereby making such pedal activated motor attachment for a hand operated food grinder economically available to the buying public.

Still yet another object of the present invention is to provide a new pedal activated motor attachment for a hand operated food grinder which provides in the apparatuses and methods of the prior art some of the advantages thereof, while simultaneously overcoming some of the disadvantages normally associated therewith.

Still another object of the present invention is to provide a new pedal activated motor attachment for a hand operated food grinder which allows a user to convert a hand operated machine into a pedal driven machine.

Yet another object of the present invention is to provide a new pedal activated motor attachment for a hand operated food grinder which includes a motor, an attaching screw, a male plug, and a foot pedal.

Still yet another object of the present invention is to provide a new pedal activated motor attachment for a hand operated food grinder that allows persons suffering with arthritis and the like to easily use their food grinder by means of a pedal.

Even still another object of the present invention is to provide a new pedal activated motor attachment for a hand operated food grinder that is adjustable and motorized and whose power source is electricity.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a view of the pedal of the present invention.

FIG. 5 is a cross sectional view taken along line 5—5 of FIG. 4.

DESCRIPTION OF THE PREFERRED EMBODIMENT

Figure 1:
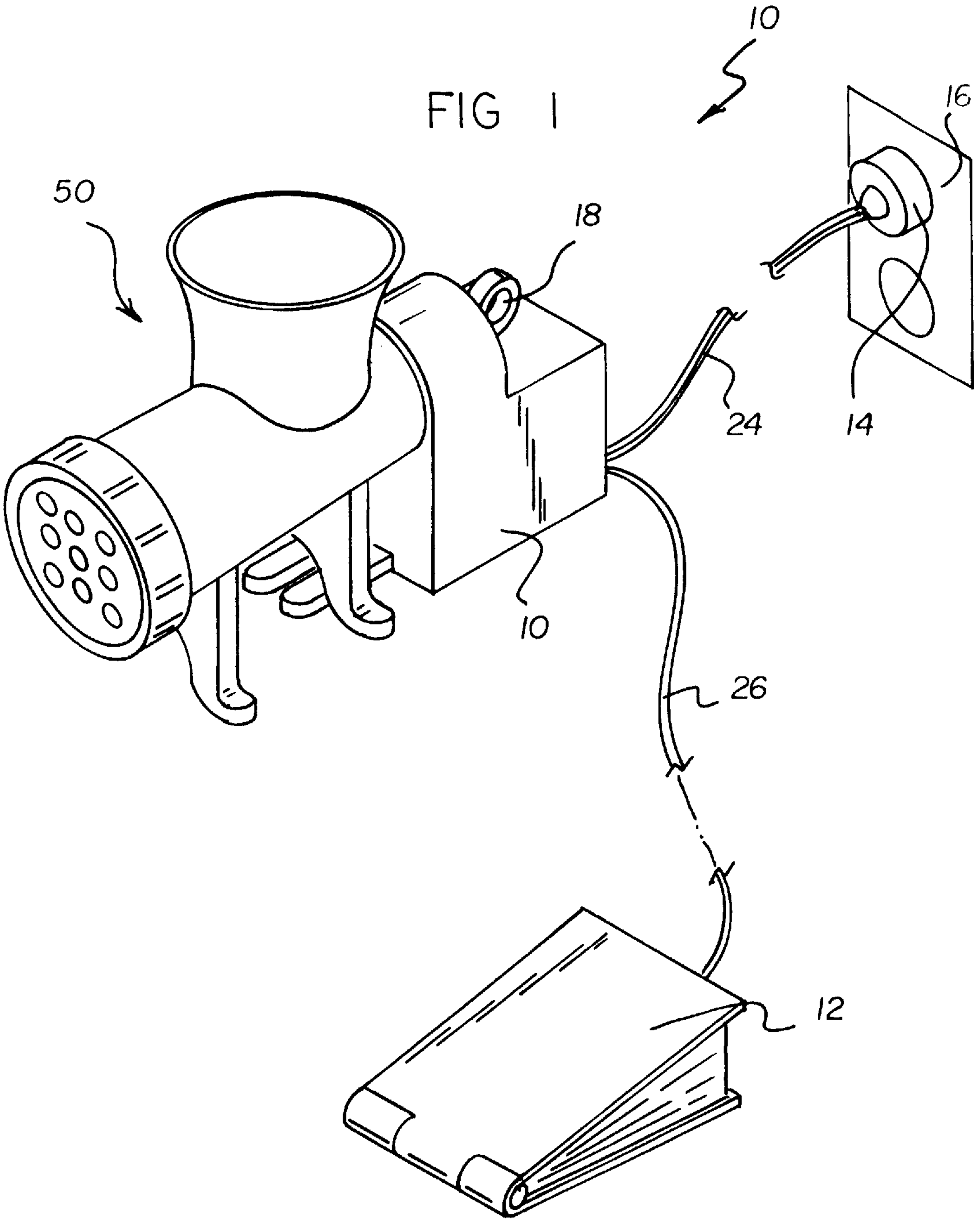
FIG. 1 is a right side perspective view of a new pedal activated motor attachment for a hand operated food grinder according to the present invention.
Figure 2:
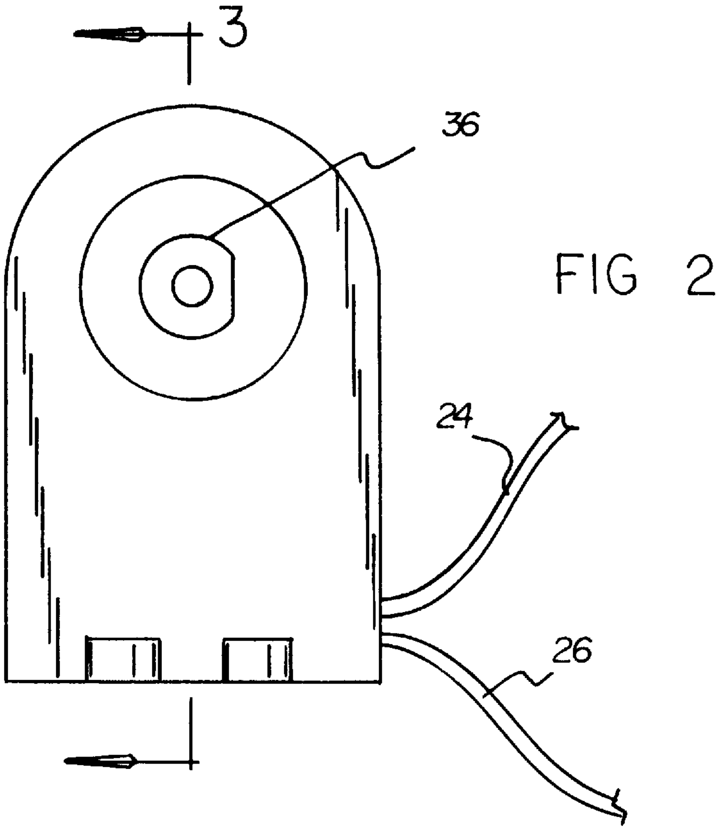
FIG. 2 is a side elevation view thereof.
Figure 3:
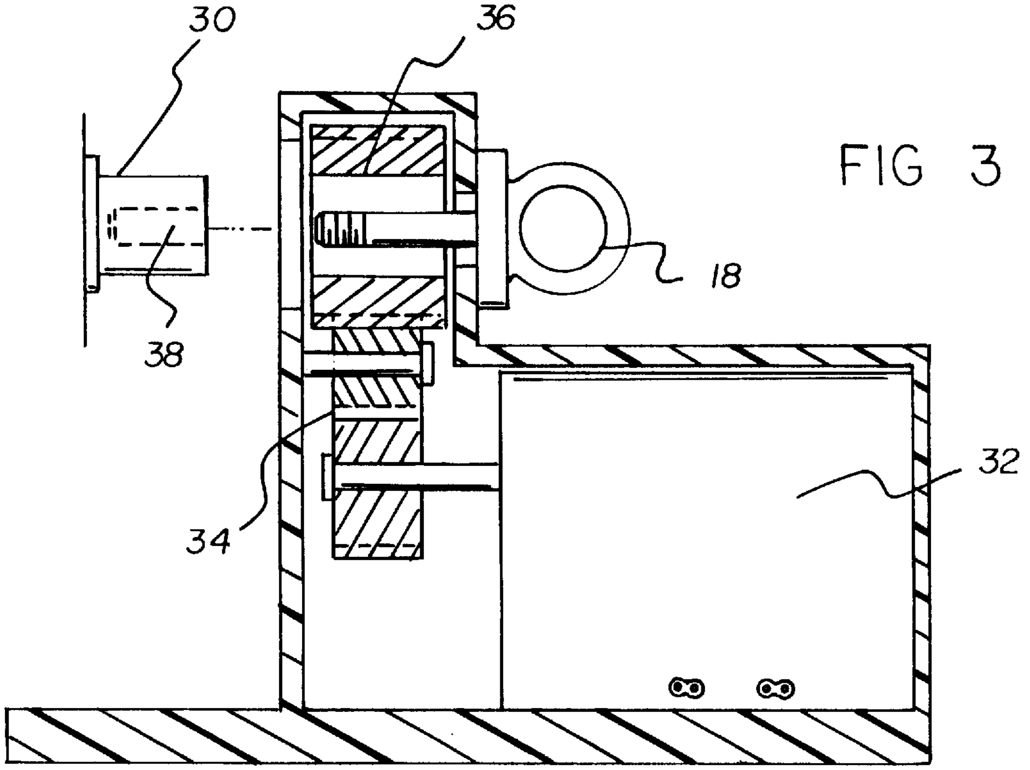
FIG. 3 is a cross sectional view taken along lines 3—3 of FIG. 2.
Figure 6:
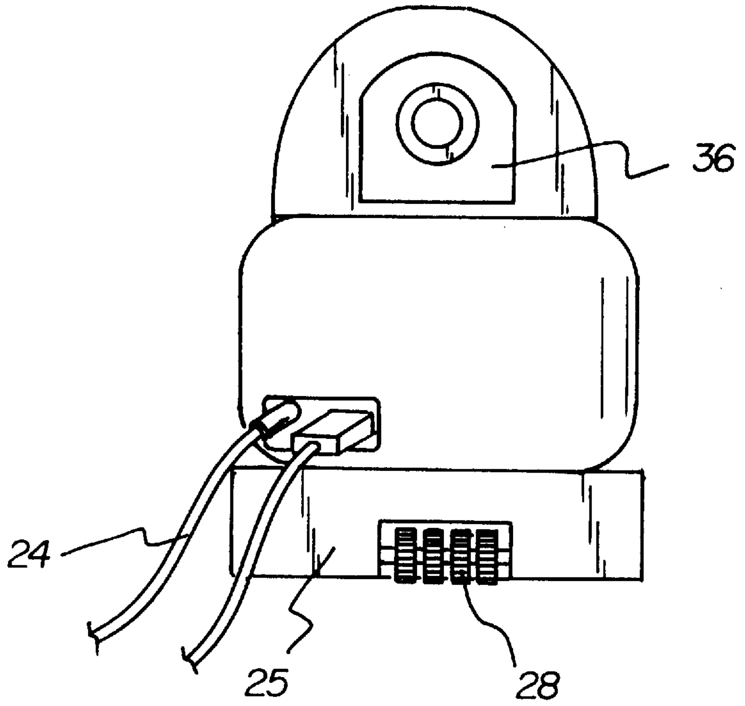
FIG. 6 is a rear view of the adjustable base of the present invention.

With reference now to the drawings, and in particular to FIGS. 1 through 6 thereof, a new pedal activated motor attachment for a hand operated food grinder embodying the principles and concepts of the present invention and generally designated by the reference numeral 10 will be described.

More specifically, it will be noted that the pedal activated motor attachment for a hand operated food grinder 10 comprises a motor, an attaching screw, a male plug, and a foot pedal.

As best illustrated in FIGS. 1 through 6, it can be shown that the a new pedal activated motor attachment for a hand operated food grinder apparatus and method which has many of the advantages of the a motor attachment mentioned heretofore and many novel features that result in a new pedal activated motor attachment for a hand operated food grinder which is not anticipated, rendered obvious, suggested, or even implied by any of the prior art a motor attachment, either alone or in any combination thereof.

In use, the present invention would eliminate the need for a person to manually grind any form of food. This pedal activated motor attachment for a hand operated food grinder 10, would be apprecciated by people who suffer form arthrithis, the elderly, or any one who does not have strength in their hands. In use, the motor asembly 10 is attached to the grinder shaft 30 of an existing grinder.

The motor 32 is a typical variable speed motor that is energised by electricity. The motor 32 can easily attach to all hand grinders at the grinder shaft 30. In operation, the handle of the food grinder is removed and the motor 32 is configured to fit into the slot 38 on the grinder. A screw 18 in the Assembly 10 is used to fixedly connect the present invention to a food machine.

The housing 44 includes the motor 32 which is attached to a set of gears 34 which move the grinder shaft 30 when the pedal 12 is activated. The housing 44 is coupled with a first electric chord 24 which ends in a male plug 14 which plugs into an electric outlet 16. The second electric chord 26 is attached to the pedal 12.which drives the food machine 50.

The pedal 12 is a typical pedal used in the industry and could be one such as used with sewing machines. The pedal 12 has springs 40 which are attached to contacts 42 which allows the response to travel to the grinder shaft 30 and cause the food machine 10 to operate. To further facilitate the easy use of the present invention further includes an adjustable base 25. The base 25 is able to move upwards and downwards to fit various types of food machines in the industry. The base 25 is controlled by an adjustable means 28. The adjustable means 28 an can be screwing type mechanism as known in the art which has a relationship with a shaft so that that the base 25 can move upwards and downwards as needed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pedal activated motor attachment for a hand operated food grinder having a grinder shaft and an attachment screw having a shaft engageable to the grinder shaft, the motor attachment comprising:

a motor positioned within a housing, said motor having a transmission axle extended outwardly therefrom;

said housing having an upper portion having a front face and a rear face, said front face having an aperture therein adapted for receiving the grinder shaft of the food grinder;

a drive gear positioned within said upper portion of the housing, said drive gear being driven by said transmission axle such that rotation of the transmission axle rotates said drive gear; said drive gear having a substantially centrally positioned socket adapted for snugly receiving the grinder shaft such that rotation of the drive gear rotates the grinder shaft;

said rear face having an aperture therein adapted for receiving the shaft of the attachment screw such that the shaft of the attachment screw is engageable to the grinder shaft when the grinder shaft is received by the socket in the drive gear whereby the drive gear is coupled to the grinder shaft;

an electric cord electrically coupled to said motor and extending outwardly through said housing; and a foot pedal electrically coupled to a distal end of said power cord such that said motor is actuatable by depression of said foot pedal.

2. The pedal activated motor attachment of claim 1 wherein drive gear is linked to the transmission axle by a plurality of gears coupled to said housing.

3. The pedal activated motor attachment of claim 1 wherein said housing includes a lower portion, said lower portion having a front face coplanar with said front face of said upper portion of said housing.

4. The pedal activated motor attachment of claim 3 wherein said housing includes a base portion adapted for resting against a receiving surface, said base portion having a plurality of projections extending outwardly from said front face of said lower portion.

5. A pedal activated motor attachment for a hand operated food grinder having a grinder shaft and an attachment screw having a shaft engageable to the grinder shaft, the motor attachment comprising:

a motor positioned within a housing, said motor having a transmission axle extended outwardly therefrom and a first gear positioned adjacent a distal end of said transmission axle;

a pin coupled to the housing and a second gear coupled to said pin, said second gear rotationally engaged to said first gear such that rotation of the first gear rotates the second gear;

said housing having an upper portion having a front face and a rear face, said front face having an aperture therein adapted for receiving the grinder shaft of the food grinder;

a drive gear positioned within said upper portion of the housing, said drive gear being rotationally engaged to said second gear such that rotation of the second gear rotates said drive gear; said drive gear having a substantially centrally positioned socket adapted for snugly receiving the grinder shaft such that rotation of the drive gear rotates the grinder shaft, said socket being adapted for removable coupling to said grinder shaft to permit intermittent manual operation of said food grinder;

said rear face having an aperture therein adapted for receiving the shaft of the attachment screw such that the shaft of the attachment screw is removably engageable to the grinder shaft when the grinder shaft is received by the socket in the drive gear whereby the drive gear is coupled to the grinder shaft;

an electric cord electrically coupled to said motor and extending outwardly through said housing; and a foot pedal electrically coupled to a distal end of said power cord such that said motor is actuatable by depression of said foot pedal.

6. The pedal activated motor attachment of claim 5 wherein said housing includes a lower portion, said lower portion having a front face coplanar with said front face of said upper portion of said housing.

7. The pedal activated motor attachment of claim 6 wherein said housing includes a base portion adapted for resting against a receiving surface, said base portion having a plurality of projections extending outwardly from said front face of said lower portion.

8. the pedal activated motor attachment of claim 1 wherein said substantially centrally positioned is adapted to be removably coupled by said attachment screw to the grinder shaft of said grinder to permit selective intermittent manual operation of said food grinder without said motor attachment.

* * * * *